(12) United States Patent
de Bruin et al.

(10) Patent No.: US 6,769,352 B2
(45) Date of Patent: Aug. 3, 2004

(54) APPARATUS FOR PREPARING A COFFEE EXTRACT WITH A FINE-BUBBLE FROTH LAYER USING A ROUGH IMPACT SURFACE

(75) Inventors: Wilhelmus Johannes de Bruin, Almere (NL); Gustaaf Frans Brouwer, Nijkerk (NL)

(73) Assignee: Sara Lee/DE N.V. (NL)

( * ) Notice: Subject to any disclaimer, the term of this patent is extended or adjusted under 35 U.S.C. 154(b) by 0 days.

(21) Appl. No.: 10/363,241

(22) PCT Filed: Sep. 5, 2001

(86) PCT No.: PCT/NL01/00656

§ 371 (c)(1),
(2), (4) Date: Jul. 31, 2003

(87) PCT Pub. No.: WO02/19877

PCT Pub. Date: Mar. 14, 2002

(65) Prior Publication Data

US 2004/0031393 A1 Feb. 19, 2004

(30) Foreign Application Priority Data

Sep. 5, 2000 (NL) .............................................. 1016106

(51) Int. Cl.[7] .............................. A23F 3/00; A23L 2/54; A47J 31/40; A47J 31/44; A47J 31/46
(52) U.S. Cl. .......................... 99/323.1; 99/275; 99/279; 99/293; 99/452; 99/453
(58) Field of Search .......................... 99/495, 452–455, 99/275, 295, 304, 307, 293, 294, 287, 279, 323.1, 323.3, 281–286, 300, 300 R, 291; 261/78.1, 121.1, DIG. 16, DIG. 76; 366/101, 163.1, 163.2, 167.1; 426/477

(56) References Cited

U.S. PATENT DOCUMENTS

| | | | | |
|---|---|---|---|---|
| 4,903,585 A | * | 2/1990 | Wimmers et al. | 99/275 |
| 5,151,199 A | | 9/1992 | Schmidley et al. | |
| 5,638,740 A | * | 6/1997 | Cai | 99/295 |
| 5,759,604 A | * | 6/1998 | Bottlinger et al. | 426/433 |
| 6,119,582 A | * | 9/2000 | Akkerman-Theunisse et al. | 99/323.1 |

FOREIGN PATENT DOCUMENTS

| EP | 0 709 131 A | 5/1996 |
|---|---|---|
| EP | 0 878 158 A | 11/1998 |

\* cited by examiner

Primary Examiner—Timothy F. Simone
(74) Attorney, Agent, or Firm—Altera Law Group, LLC (57) ABSTRACT

This invention relates to an apparatus for preparing a coffee extract with a fine-bubble froth layer, provided with at least one inlet (2) to which coffee extract is supplied, at least one outlet (4.1; 4.2) for dispensing the coffee extract with the fine-bubble froth layer and at least one liquid flow path extending from the at least one inlet (2) to the at least one outlet (4.1; 4.2) and along which, in use, the coffee extract flows from the at least one inlet (2) to the at least one outlet (4.1; 4.2) while in the liquid flow path a liquid impact surface (12) is included and the at least one inlet is provided with at least one spout opening for generating at least one coffee extract jet which, in use, squirts to the liquid impact surface when the coffee extract is supplied to the at least one inlet. According to the invention, the impact surface (12) is provided with a roughened surface structure.

27 Claims, 4 Drawing Sheets

APPARATUS FOR PREPARING A COFFEE EXTRACT WITH A FINE-BUBBLE FROTH LAYER USING A ROUGH IMPACT SURFACE

This invention relates to an apparatus for preparing a coffee extract with a fine-bubble froth layer, provided with at least one inlet to which coffee extract is supplied, at least one outlet for dispensing, the coffee extract with the fine-bubble froth layer and at least one liquid flow path extending from the at least one inlet to the at least one outlet and along which, in use, the coffee extract flows from the at least one inlet to the at least one outlet, while in the liquid flow path a liquid impact surface is included and the at least one inlet is provided with at least one spout opening for generating at least one coffee extract jet which, in use, squirts to the liquid impact surface when the coffee extract is supplied to the at least one inlet.

Such an apparatus is known per se from the European patent application no. 0 878 158. In the known apparatus, in the liquid flow path a receiving reservoir is included with an upright sidewall and a bottom, the bottom of the receiving reservoir forming the impact surface, so that the coffee extract jet, in use, squirts into the receiving reservoir. Upon the coffee extract jet squirting into the receiving reservoir, a fine-bubble froth layer (also called café crème) will be formed as a result of the impingement of the coffee extract jet on the impact surface and in particular through impingement of the coffee extract jet on the liquid surface of a layer of coffee extract located in the receiving reservoir and previously supplied to the receiving reservoir. A café crème comprises air-filled coffee bubbles floating on the coffee surface, here called the fine-bubble froth layer. The coffee extract with the thus formed fine-bubble froth layer in the receiving reservoir will subsequently flow from the receiving reservoir to the at least one outlet and can thus be supplied to a holder for coffee, such as, for instance, a cup.

Although the apparatus is most satisfactory, there is the wish to still further improve the apparatus, such that an even more predictable fine-bubble froth layer is formed. By this is meant that the fine-bubble froth layer has a uniform character, the variation of the large ones of the bubbles in the froth layer being relatively small. By this is additionally meant that the relevant fine-bubble froth layer is dispensed in a uniformly repeated manner. In other words, when preparing a new amount of coffee extract with a fine-bubble froth layer, it will be at least substantially the same as an amount of coffee extract with a fine-bubble froth layer previously prepared by means of the apparatus. Furthermore, there is the wish to be able to generate the coffee extract with the fine-bubble froth layer in a manner in which the coffee extract jet may possibly have a smaller flow rate than the coffee extract jet in the known apparatus without adversely affecting the properties of the fine-bubble froth layer. This has the advantage that at the inlet a lower pressure is sufficient so that leakage less easily occurs.

The variation of the flow rate, more in particular the increase in flow rate, may be a result of, for instance, ageing of the apparatus. The apparatus is often provided with known per se means to supply coffee extract to the inlet under pressure. These known per se means, such as a Neapolitan apparatus or an apparatus comprising a pump for generating the pressure, have the property that the pressure of the coffee extract may vary. This variation may be connected with the age of the apparatus. This variation, however, is still much more connected with the thickness of a coffee bed through which hot water must be pressed to obtain the coffee extract supplied to the at least one inlet. When the thickness increases, the pressure drop over the coffee bed will increase, which has the result that the pressure of the coffee extract supplied to the inlet decreases. This means that the flow rate of the at least one coffee extract jet decreases. Also when the grain size of the ground coffee of the coffee bed decreases, the pressure drop over the coffee bed will increase, and the flow rate will thus decrease. It is therefore an object of the invention to make the characteristic properties of the formed fine-bubble froth layer less dependent on the flow rate of the coffee extract jet, and thus less dependent on the pressure of the coffee extract supplied to the inlet. It is thus ensured that the apparatus can properly function when using coffee beds having a varying thickness and grain size, and in apparatuses in which the pressure of the coffee extract supplied to the contents varies.

The apparatus according to the invention has for its object to provide a solution for the above wishes. Accordingly, the apparatus is characterized in that the impact surface, at least part of it, is provided with a roughened surface structure.

It appears that the impact surface having the roughened surface structure contributes to an increasing predictability of the fine-bubble froth layer, and that, moreover, the fine-bubble froth layer can be obtained at a smaller flow rate than that of the liquid jet in the known apparatus. This implies that the range of the flow rate of the liquid jet at which the fine-bubble froth layer can be obtained, increases with properties comparable to those of the fine-bubble froth layer obtained in the known apparatus. It even appears that the uniform character of the fine-bubble froth layer is improved. This has the result that the predictability of the fine-bubble froth layer increases because even at a varying flow rate, which flow rate, for whatever reason, decreases over time, the desired fine-bubble froth layer is obtained. It is not quite clear what processes take place on a microscale at the impact surface, which process contribute to obtaining a solution for the above wishes. The roughened surface structure will possibly cause very local turbulencenses in the coffee extract near the impact surface and/or limit liquid flows. Thee turbulences and/or limited liquid flows contribute to obtaining the desired predictable fine-bubble froth layer through, for instance, impingement of air.

Preferably, it holds that the surface structure has a surface roughness corresponding to the surface roughness of abrasive paper comprising particles having an average diameter of 50-2000 $\mu$m. It appears that in this range of the surface roughness the desired effects are already well obtained.

In particular, it holds that the surface structure has a surface roughness corresponding to the surface roughness of abrasive paper in the range of P12 to P600. The P standard according to FEPA (Federation of European Producers of Abrasives) is used here. Preferably, it holds that the surface structure has a surface roughness corresponding to the surface roughness of abrasive paper in the range of P30 to P300. In this range of surface roughness, a fine-bubble froth layer is obtained with a desired optimum result. That is to say the fine-bubble froth layer is excellently predictable.

The roughened surface may be obtained in several ways. It is possible that the impact surface is subjected to a spark treatment. It is also possible, however, that the impact surface is sandblasted and/or chemically etched.

It also appears that it impossible that along the impact surface a gauze is provided to obtain the roughened surface structure. The gauze may have, for instance, the structure of the known per se aseptic gauze or sieve gauze and be made of metal. Preferably, it holds that in the at least one liquid flow path a receiving reservoir is included with an upright sidewall and a bottom, the bottom of the receiving reservoir forming the impact surface so that the at least one coffee extract jet, in use, squirts into the receiving reservoir. The size of the part of the surface provided with the roughened surface structure is, for instance, a circle having a diameter of about 2 cm.

The impact surface, that is to say the bottom of the receiving reservoir, may be directed such that a normal of the impact surface includes an angle A to the coffee extract jet which is less than 80°. In general, the coffee extract jet will be directed vertically; but this, too, is not necessary. The receiving reservoir may be of such design that it rapidly empties so that an, at least substantially, direct impingement of the at least one coffee extract jet on the part of the impact surface that comprises the roughened surface structure is continuously obtained. The buffer reservoir is at least substantially not filled. Due to this roughened surface, the fine-bubble froth layer is formed.

According to a special variant, after coffee extract has been supplied to the buffer reservoir for some time, in the receiving reservoir a liquid level will be formed at which the fine-bubble froth layer is then formed by impingement of the coffee extract jet on the liquid level. The roughened surface then has a liquid flow decelerating effect and thus enhances the formation of froth. It appears that in that case, also at a lower flow rate in the known apparatus, the desired fine-bubble froth layer is formed.

According to the invention, however, a receiving reservoir is not necessary. It is also possible that the impact surface only consists of a two-dimensional surface without upright side walls. The coffee extract can then, after an impingement of the coffee extract jet on the impact surface, flow away from the impact surface to the outlet. The fine-bubble froth layer is then formed again by local turbulences so that air is enclosed. A further advantage of this variant and the variant in which the receiving reservoir empties rapidly is that less afterflow results, the froth remains better intact, and a higher cup temperature can be achieved. To this end, a normal of the impact surface may include, for instance, an angle A to the coffee extract jet which is about equal to 45°.

According to a very advanced embodiment, it farther holds that in the variant provided with the receiving reservoir a liquid flow decelerating barrier located at a distance from the upright side walls is included in the receiving reservoir. Through the presence of the liquid flow decelerating barrier the liquid flow in the receiving reservoir is limited. The result is that the liquid level that may be formed in the receiving reservoir upon an impingement of the coffee extract jet on the layer of liquid in the receiving reservoir, has a calm less undulating ppearance than if the liquid flow decelerating barrier were not provided. The effect is therefore that liquid flows and turbulences on a macroscale in the receiving reservoir are reduced by the liquid flow decelerating barrier. It is shown by way of experiment that the range of the flow rate of the coffee extract jet in which the predictable uniform fine-bubble froth layer is formed is further increased. Also when the flow rate of the liquid extract jet increases relative to the flow rates providing the desired fine-bubble froth layer in the known apparatus, a very predictable fine-bubble froth layer is still obtained. Simultaneously, the roughened surface, on a microscale, provides small local turbulences, which also enhances the predictability and quality of the fine-bubble froth layer.

Preferably, it holds that the liquid flow decelerating barrier is included between a central part of the receiving reservoir and the upright side walls. Here, for instance, the coffee extract jet can impinge on the central part. To this end, the coffee extract jet is directed to the central part. It particulary holds that the receiving reservoir is provided with at least one liquid discharge path for discharging coffee extract from the receiving reservoir to the at least one outlet, while the at least one liquid discharge path originates outside, viewed from the central part, the liquid flow decelerating barrier. It appears that in this manner a, in use, very calm liquid discharge from the receiving reservoir to the at least one outlet is obtained, which has the result that an excellently predictable uniform fine-bubble froth layer is obtained which has a quality typified by connoisseurs as very good.

Preferably, it holds that the liquid flow decelerating barrier extends along a first closed curve extending around the central part.

In particular when it is desired to provide, for instance, two outlets with an equal amount of coffee extract, this embodiment is preferred because two liquid discharge paths can be symmetrically arranged in the apparatus which each originate outside, viewed from the central part, the liquid flow decelerating barrier, and which ach supply coffee extract with a fine-bubble froth layer to one of the two outlets, at an at least substantially equal flow rate.

The invention will presently be further elucidated with reference to the drawing. In the drawing.

Figure 1:
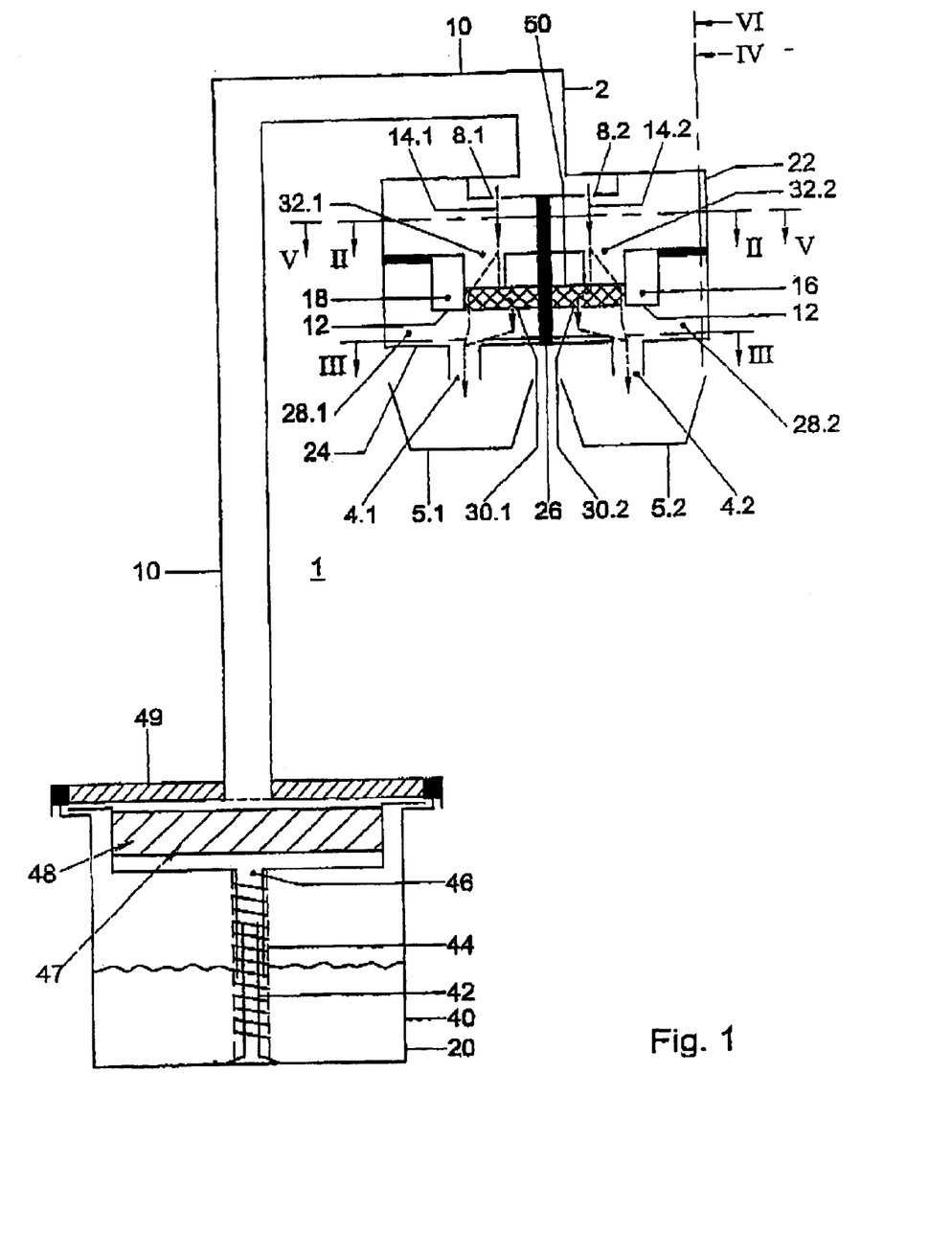
FIG. 1 shows a transparent view of a first and second embodiment of an apparatus according to the invention.

In FIG. 1 reference numeral (1) designates an apparatus for preparing a coffee extract with a fine-bubble froth layer. The apparatus is provided with at least one inlet (2), to which coffee extract can be supplied. Further, the apparatus comprises a first outlet (4.1) and a second outlet (4.2) for dispensing the coffee extract with the fine-bubble froth layer. In use, under each outlet (4.1) and (4.2) a cup (5.1) and (5.2) can be placed to be filled with the coffee extract with the fine-bubble froth layer (café crème). It is also possible that a single cup is placed under both outlets (4.1) and (4.2), so that only one cup is filled from both outlets.

The apparatus comprises at least one liquid flow path (6) which extends from the at least one outlet (2) to the outlets (4.1) and (4.2). In use, the coffee extract flows from the at least one outlet along the liquid flow path (6) to the first and the second outlet (4.1) and (42). The inlet (2) in the example is provided with a first and second spout opening (8.1) and (8.2), which are each arranged for generating a liquid coffee extract jet when coffee extract is supplied, in the example via a duct (10), to the inlet (2).

In the liquid flow path (6), a liquid impact surface (12) is included, the arrangement being such that in use the coffee extract jets (14.1) and (14.2) generated by the two spout openings spout towards the liquid impact surface (12) when the coffee extract is supplied under pressure via the duct (10) to the inlet (2).

In this example, the liquid flow path (6) includes a receiving reservoir (16) with upright sidewalls (18) and a bottom (12), the bottom (12) of the receiving reservoir (16) constituting the impact surface (12). As a consequence of all this, in use, the coffee extract jets (14.1) and (14.2) spout into the receiving reservoir. Further, it holds that the impact surface (12) is provided with a roughened surface structure. In this example, the entire impact surface is provided with the roughened surface structure.

The apparatus further comprises means (20), known per se, for generating the coffee extract and for supplying the coffee extract to the duct (10) at a pressures, for instance, 0.3 to 3 atmosphere. The inlet with the spout openings brings about an increase of the flow velocity relative to the flow velocity of the coffee extract in the duct (10). To that end, the surface area of each of the spout openings (8.1) and (8.2) equals, for instance, 0.05-0.5 mm$^2$.

The receiving reservoir (16) in this example is situated in a housing (22). The housing (22) comprises a bottom (24) with the outlets (4.1) and (42). Further, within the housing (22), outside the receiving reservoir (16), a partition (26) is arranged which divides a space in the middle of the housing (22), outside the receiving reservoir (16), into two mutually separate parts (28.1) and (28.2). The arrangement is such that the first outlet (4.1) is in fluid communication with the first part (28.1) of the housing (22). Further, the second outlet (4.2) is in fluid communication with the second part (28.2) of the housing (22).

In the upright sidewall (18) of the receiving reservoir, a first through-flow opening (32.1) is provided which extends from an upper side of the sidewall in the direction of the bottom (12). The first through-flow opening (32.1) in tis example ends as far as the bottom (12) and therefore constitutes a drain from the receiving reservoir (16) to the first part (28.1) of the housing (22). Similarly, in the upright sidewall (18) of the receiving reservoir (16) a second through-flow opening (32.2) is provided which constitutes a drain from the receiving reservoir (16) to the second part (28.2) of the housing (22).

The apparatus (20), known per se, for preparing the coffee extract is provided, in this example, with a container (40) which in use is filled with water. In the container (40) a heating element (42) is arranged. The heating element (42) is arranged around a riser pipe (44) which terminates in the bottom of a sachet holder (46). In use, the sachet holder (46) accommodates a sachet (47), made, for, instance, of filtering paper, which is filled with ground coffee (48). Placed on top of the sachet holder (46) is a lid (49) by which the reservoir (40), with the sachet holder (46) accommodated therein, is then closed off vapor-tightly. The duct (10) is in communication via the lid (49) with an inner space of the counter (40).

The apparatus described up to this point work as follows. The reservoir (40) is filled with water. Next, with the aid of the heating element (42) the water is heated. As a result, the vapor pressure in the container (40) will rise. The result is that the heated water in the riser pipe (44) is forced up towards the sachet holder (46). In the sachet holder (46), the water, hot by now, will be forced through the sachet (47). This yields coffee extract which is supplied under pressure to the duct (10). Under pressure, the coffee extract flows to the inlet (2). The coffee extract which is supplied under pressure to the inlet (2) squirts out via the spout openings (8.1) and (8.2), respectively. Thus, a first coffee extract jet (14.1) spouts towards the bottom (12) in the receiving reservoir (16). Similarly, a second coffee extract jet (14.2) spouts to the bottom (12) of the receiving reservoir (16). When the coffee extract jets strike the bottom (12), then, as a result of the impingement on the roughened impact surface (12), the desired fine-bubble froth layer will be formed. Upon the impingement on the roughened impact surface 12 (the bottom 12), there arises local turbulence whereby air is beaten into the coffee extract, thereby forming the fine-bubble froth layer. The coffee extract with the fine-bubble froth layer will flow via the first through-flow opening (82.1) to the first part (28.1) of the housing (22). Via the first part (28.1) the coffee extract then flows via the outlet (4.1) into the cup (5.1). At the same time, coffee extract with a fine-bubble froth layer will flow via the second through-flow opening (32.2) in the upright sidewall (18) to the second part (28.2) of the housing (22). From the second part (28.2), the coffee extract with a fine-bubble froth layer will flow via the outlet (4.2) to the cup (5.2).

It appears that by virtue of the fact that the impact surface is provided with a roughened surface structure, given a coffee extract jet (14.1) comprising a flow rate of only 4 grams per second, already a predictable stable fine-bubble froth layer is formed on the coffee extract. The same applies to the coffee extract jet (14.2). In this example, the apparatus (20) is so dimensioned that each of the coffee extract jets comprises a flow of 6 grams per second. As a result of all this, even when the flow rates of the coffee extract jets will vary to some extent and, for instance, in the course of time, for whatever reason, decrease, still the same kind of coffee extract with a fine-bubble froth layer is formed. The formation of coffee extract with a fine-bubble froth layer is therefore predictable. Moreover, it appears that by virtue of the roughened surface, the fine-bubble froth layer has a relatively homogeneous structure. This is to say that the range of diameters of formed bubbles is relatively small. Experts accordingly refer to a fine-bubble froth layer of a uniform character.

When upon elapse of a predetermined time the apparatus (20) stops supplying coffee extract to the inlet (2), the coffee extract jets (14.1) and (14.2) will be interrupted. The receiving reservoir can then drain entirely via the through-flow openings (32.1) and (32.2). Thus, the receiving reservoir drains towards the outlets (4.1) and (4.2).

Due to the fact that in use equal amounts flow through the openings (8.1) and (8.2) and the through-flow openings (32.1) and (32.2), the cups (5.1) and (5.2) will be filled with a presently substantially equal amount of coffee extract.

Preferably, it holds that surface structure of the surface (12) (the impact surface 12) has a surface roughness corresponding to the surface roughness of sandpaper comprising particles having an average diameter of 50 to 2000 microns. In particular, it holds that the surface structure has a surface roughness corresponding to the surface roughness of sandpaper in the range of P12 to P300. Preferably, it holds that the surface structure has a surface roughness corresponding to the surface roughness of sandpaper in the range of P30 to P300.

Naturally, the roughness of the surface structure of the impact surface (12) can also be determined with other parameters. Thus, the surface structure can also have a surface roughness Ra in a range of 50 to 2000 um. Preferably, however, Ra has a range of 50 to 200 um.

The roughened surface structure can be provided in various ways. To be considered here are, for instance, an impact surface which has been subjected to a spark treatment. It is also possible that the impact surface (12) has been sand-blasted. In addition, it is possible that the impact surface has be n chemically etched. A combination of these techniques is also possible.

Figure 5:
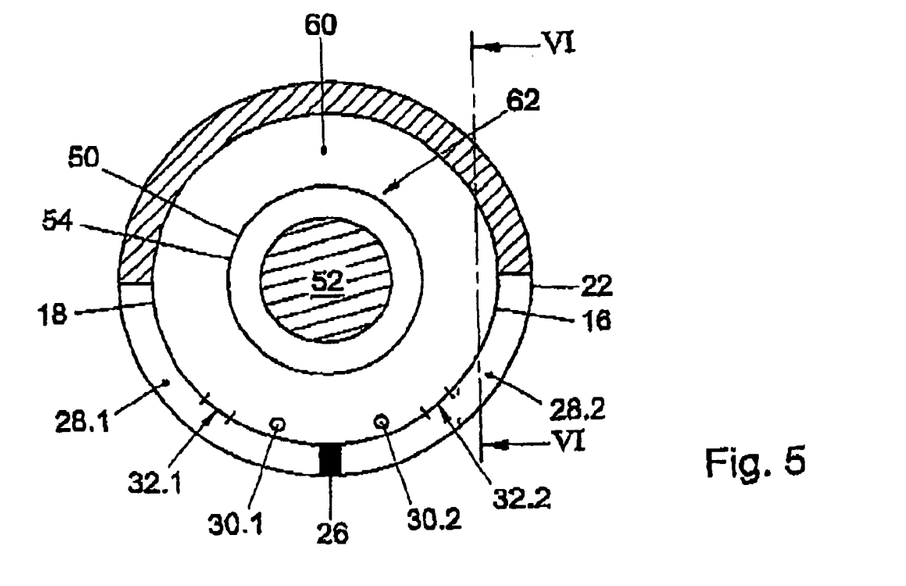
FIG. 5 shows a cross section of a portion of the second embodiment of the apparatus according to FIG. 1.

It is also possible that along the impact surface (12) a gauze (60) is arranged for obtaining the roughened surface structure. This is shown in FIG. 5. A gauze could be, for instance, a fabric of metal wires having a pitch distance and a diameter of the metal wires respectively corresponding to the pitch and the diameter of wires of a bandaid fabric. This metal fabric can be provided on the bottom of the receiving reservoir by means of glue, for instance. It is also possible that on the gauze, in turn, a thin plastic covering layer or a coating has been provided. In effect, however, the bottom (12) will have a roughened surface structure. It is also conceivable that the gauze (60) is placed above the bottom 12 and the coffee extract jet (14.1) and/or (14.2) flows through it. In effect, this gauze then constitutes the roughened impact surface. After the coffee extract jet (14.1) and/or (14.2) has flowed through this gauze, the desired coffee with the fine-bubble froth layer is obtained, which optionally without interposition of the buffer reservoir, can be supplied directly to a cup (5.1) and/or (5.2), respectively. The gauze then in fact also constitutes the outlet (4.1) and/or (4.2).

It is also possible that the first and second opening 32.1 and 32.2 do not extend as far as the bottom, thereby forming an overflow. In use, the receiving reservoir will then fill with coffee extract. When the coffee extract jets strike the bottom (12), again, already bubbles will be formed as discussed hereinbefore. Next, the receiving reservoir (16) will proceed to fill to some extent with the coffee extract. The coffee extract jets (14.1) and (14.2) then squirt onto the liquid surface of the coffee extract present in the receiving reservoir (16). As a result of a complex of factors, such as the coffee extract jets that squirt into the liquid, the coffee extract jets which, albeit depending on the height of the liquid level in the receiving reservoir, spout against the bottom (12), and the roughened surface structure of the bottom which causes local turbulences on a microscale, a fine-bubble froth layer is formed on the coffee extract. The function of the roughened impact surface in this variant is, in particular, to limit the liquid flows in the receiving reservoir. When the liquid level has risen sufficiently, the coffee extract with the fine-bubble froth layer will flow away via the through-flow openings (32.1) and (32.2), which then function as overflows. Further, in this variant, in the bottom (12) of the receiving reservoir, a first and a second drain opening (30.1) and (30.2) are provided. The first drain opening (30.1) constitutes a fluid communication between the inside of the receiving reservoir (16) and the first part (28.1) of the housing (22). Further, the second drain opening (30.2) provides a fluid communication between the insides of the receiving reservoir (16) and the second part (28.2) of the housing (22).

After use, the receiving reservoir will drain completely via the drain openings (30.1) and (30.2). In this example, the drain openings (30.1) and (30.2) have such dimensions that, in use, per unit time, more coffee extract is supplied to the buffer reservoir (12) via the spout openings (8.1) and (8.2) than is discharged from the buffer reservoir via the drain openings (30.1) and (30.2). Thus a layer of coffee extract is formed in the buffer reservoir.

Figure 2:
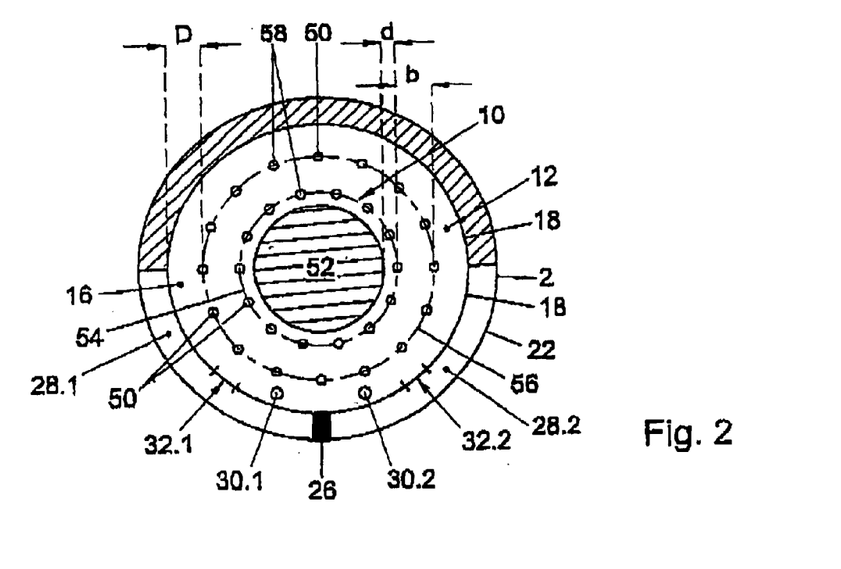
FIG. 2 shows a cross section of a portion of the first embodiment of the apparatus according to FIG. 1.
Figure 3:
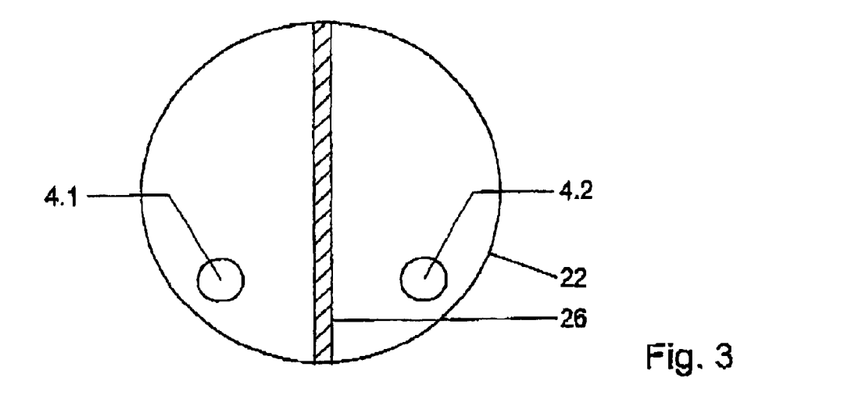
FIG. 3 shows a cross section of a portion of the first and second embodiment of the apparatus according to FIG. 1.
Figure 4:
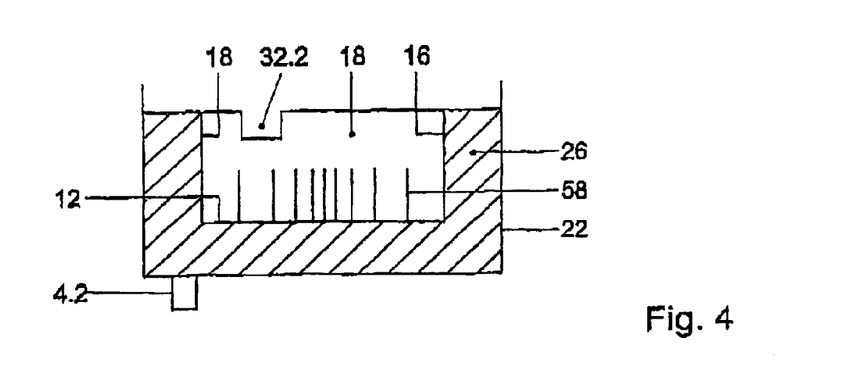
FIG. 4 shows a cross section of a portion of the first embodiment of the apparatus according to FIG. 1.

In the variant with through-flow opening which function as overflow, there may be provided in the receiving reservoir a liquid flow decelerating barrier (50) located at a distance from the upright sidewalls (18), indicated only schematically in FIG. 1. The function of the liquid flow decelerating barrier is to reduce liquid flows and turbulences which occur on a macroscale in the receiving reservoir. This involves in particular the variant wherein the openings 40.1 and 40.2 do not extend as far as the bottom and hence constitute overflows. As can be properly seen in FIG. 2, the liquid flow decelerating barrier is included between a central portion (52) of the receiving reservoir, hatched in the drawing, and the upright sidewalls (18). The smallest distance between the liquid flow decelerating barrier and the upright sidewall is indicated in FIG. 2 by 'D'. Similarly, the smallest distance between the liquid flow decelerating barrier and the central portion (52) is indicated in FIG. 2 by 'd'. In the example, the coffee extract jets (14.1) add (14.2) are directed towards the central portion (52). Accordingly, they will strike this central portion (52) depending on the height of the liquid level.

The drain openings (30.1) and (30.2) are situated between the upright sidewall (18) and the liquid flow decelerating barrier (50). As a consequence, the drain openings (30.1) and (30.2) as well as the through-flow openings (32.1) and (32.2) constitute liquid paths for discharging coffee extract from the receiving reservoir to the outlets, these liquid discharge paths finding their origin outside, viewed from the central portion, the liquid flow decelerating barrier (50).

In this example, the liquid flow decelerating barrier (50) extends along a first closed curve (54) extending around the central portion (52). In this example, the closed curve (54) is a circle. Further, the liquid flow decelerating barrier extends along a second closed curve (56), which extends around the first curve (54) at a distance 'b'. In this example, the liquid flow decelerating barrier (50) is provided with a number of spaced apart obstacles (58) extending upwards from the bottom of the receiving reservoir. In this example, the obstacles are of pin-shaped design. Each obstacle can therefor consist of, for instance, a metal pin which reaches upwards from the bottom (12). The height of the pin can be equal, for instance, to the total height of the receiving reservoir or the height of the receiving reservoir adjacent the through-flow openings (32.1) and (32.2). The height of the pins, however, can also be lower than the height of the receiving reservoir adjacent the through-flow openings (32.1) and (32.2).

In this example, the pin-shaped obstacles (58) are disposed both on the first curve (54) and on the second curve (56), which is likewise of circular design.

The effect of the liquid flow decelerating barrier can be described as follows. When the coffee extract jets (14.1) and (14.2) spout into the receiving reservoir, they cause large currents in the receiving reservoir which are accompanied by large turbulences. This translates into a vehemently whirling liquid surface in the receiving reservoir. It has been found that this vehemently whirling liquid surface has as a result that the possible range of the flow rate of each of the coffee extract jets at which a uniform and predictable fine-bubble froth layer is formed, is limited. One can think of, for instance, a flow rate of 5 grams per second to 5.5 grams per second, at which a uniform, even fine-bubble froth layer is formed. If the flow rate for whatever reason increase or decreases, a deviant or non fine-bubble froth layer will be formed.

The liquid flow decelerating barrier, however, had as a consequence that the magnitude of the liquid flows within the receiving reservoir (16) and the attendant turbulences are reduced. It appears that the range of the flow rates of each of the coffee extract jets (14.1) and (14.2) at which the desired uniform fine-bubble froth layer is obtained, is enlarged. The maximum of the range is raised to, for instance, 7 grams per second. At the same time, the bottom (12) with its roughened surface structure has as a result that the minimum of the range is lowered to 4.5 grams per second. Thus the range of the flow rates of the coffee extract jets is enlarged considerably by virtue of the liquid flow decelerating barrier.

The liquid flow decelerating barrier is used particularly effectively in that all coffee extract must in principle pass the liquid flow decelerating barrier (50), because on the one hand the coffee extract jets (14.1) and (14.2) are directed to the central portion (52) and on the other hand the openings (30.1) and (30.2) as well as the openings (28.1) and (28.2) are located outside, viewed from the central portion (52), the liquid flow decelerating barrier. In other words, the coffee extract with the fine-bubble froth layer can leave the receiving reservoir via liquid discharge paths whose origin, viewed from the central portion, is located outside the liquid flow decelerating barrier.

The liquid flow decelerating barrier (50) moreover has the advantage that coffee extract with the fine-bubble froth layer will flow in an equal amount from the receiving reservoir to the first and second outlet (4.1) and (4.2), so that the cups (5.1) and (5.2) will presently be filled substantially equally. This is directly related to the fact that by virtue of the liquid flow decelerating barrier, the liquid surface in the receiving reservoir is relatively calm and will swirl little owing to the suppressed turbulence and liquid flows in the receiving reservoir.

Figure 6:
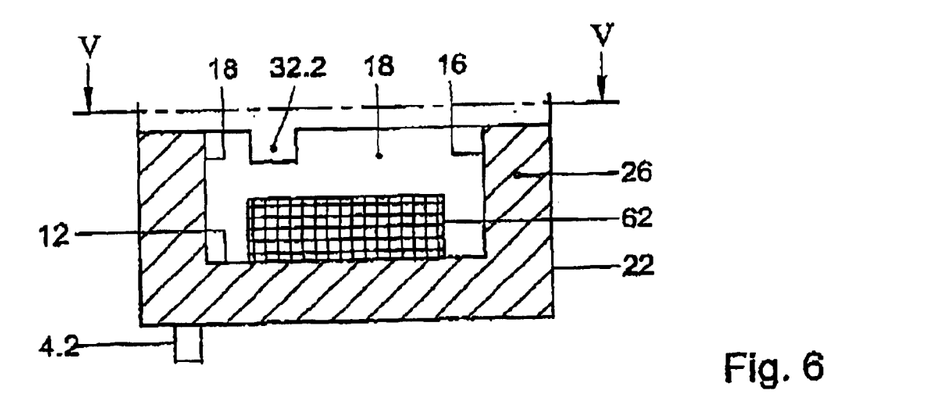
FIG. 6 shows a cross section of a portion of the second embodiment of the apparatus according to FIG. 1.

Referring to FIGS. 1, 5 and 6, presently a second possible embodiment of the apparatus 1 according to the invention will be discussed. Parts corresponding with the first embodiment are provided with the same reference numerals. In this apparatus, the bottom (12) of the receiving reservoir (16) is provided with the earlier mentioned gauze (60) for obtaining the impact surface roughened surface structure, as discussed hereinbefore. Further, however, the liquid flow decelerating barrier (50) is provided with an upright gauze wall (62) extending from the bottom (12) of this receiving reservoir (16) away from the bottom. The gauze wall (62) extends along the first curve (54). In this example, no gauze extends along the second curve (56). The gauze wall (62) therefore constitutes a cylinder wall manufactured from gauze, through which the coffee extract present in the receiving reservoir (16) can flow. The gauze wall consists, for instance, of wires of a diameter of 0.3 millimeter. These wires have been woven according to a linen binding with a pitch of 1.5 millimeter. The function of the gauze wall is entirely comparable with the functions of the pin-shaped projections (58) of the apparatus according to FIG. 2, and will therefore not be elucidated here. The dimensions of the gauze (60) mentioned above can be comparable or the same.

Finally, referring to FIGS. 7 and 8, a third embodiment of an apparatus according to the invention will be discussed. Parts corresponding to those in FIGS. 1 to 6 are provided with the same reference numerals.

Figure 7:
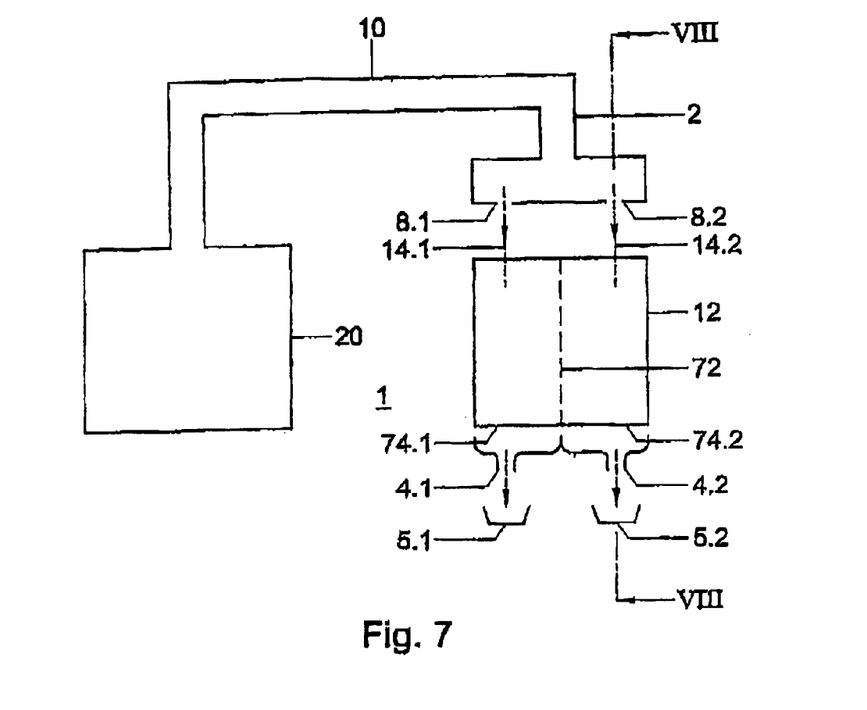
FIG. 7 shows an elevation of a third embodiment of an apparatus according to the invention.
Figure 8:
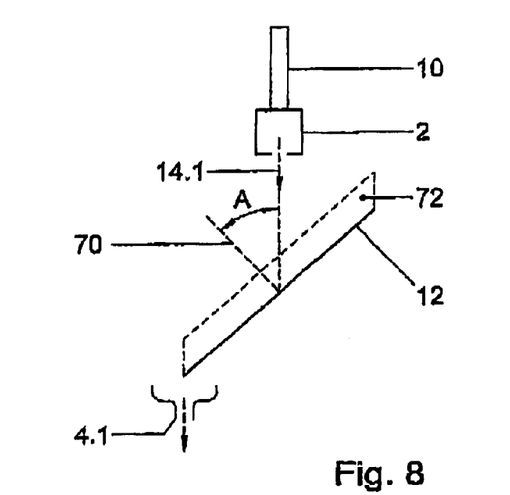
FIG. 8 shows a cross section of the apparatus according to FIG. 7.

Entirely analogously, the apparatus (1) according to FIGS. 7 and 8 is provided with an inlet (2) with spout openings (8.1) and (8.2). With the aid of the apparatus (20) discussed earlier, via the duct (10), coffee extract is supplied to the inlet (2). The impact surface (12) is positioned such that the coffee extract jets (14.1) and (14.2) each spout onto the impact surface (12). The entire impact surface is provided with a roughened surface structure. The impact surface (12), however, comprises no upright sidewalls, so that the apparatus does not comprise a receiving reservoir (16) either. As can be properly seen in FIG. 8, a normal (70) of the impact surface, (12) includes an angle 'A' with the coffee extract jets (14.1) and (14.2), which is approximately equal to 45 degrees. The impact surface (12) again has a roughened surface structure as has been discussed in relation to FIGS. 1 to 6.

The operation of the apparatus according to FIGS. 7 and 8 is as follows. With the aid of the apparatus (20), as discussed before, coffee extract is supplied under pressure to the duct (10). Via the duct (10), the coffee extract is supplied in liquid form to the inlet (2). Via the inlet (2) the coffee extract squirts out via the spout openings (8.1) and (8.2). Thus the coffee extract jets (14.1) and (14.2) are formed. The coffee extract jets (14.1) and (14.2) each spout towards the impact surface (12). The coffee extract jets (14.1) and (14.2) also spout on to the impact surface (12), whereafter the coffee extract flows down along the compact surface (12) towards the outlets (4.1) and (4.2). Thus the cups (5.1) and (5.2) are each filled with coffee extract.

What is accomplished as a result of the impingement of the coffee extract jets (14.1) and (14.2) in combination with the roughened surface structure of the impact surface (12) is that upon the impingement, a fine-bubble froth layer is formed. The coffee extract sliding down along the impact surface (12) therefore comprises the desired small-bubble froth layer. It appears that in particular due to the roughened surface structure a proper small-bubble froth layer is obtained, which has a uniform character and moreover is predictable, also at the earlier described range of flow rates of the coffee extract jets (14.1) and (14.2). The roughened surface structure of the impact surface (12) can have a roughness value as has been discussed in relation to FIGS. 1 to 6. It is also possible that only a part of the flow surface is provided with the roughened surface structure, in which case, though, the coffee extract jets impinge on this roughened part.

The invention is not limited in any way to the exemplary embodiments outlined hereinbefore.

Thus, the bottom (12) of the receiving reservoir according to the FIGS. 1 to 6, viewed from above, can be of slightly convex design. This promotes drainage via the openings (30.1) and (30.2). Also, in the apparatus according to FIGS. 1 to 6, the inlet (2) can be designed with only one spout opening (8.1), which is then located, for instance, in the middle of the inlet (2). Thus, only one coffee extract (14.1) is spouted into a receiving reservoir. The fine-bubble froth layer, however, is formed in an entirely analogous manner. Also, the cups (5.1) and (5.2) will be filled from the receiving reservoir, respectively via the through-flow openings (32.1) and (32.2), the drain openings (30.1) and (30,2), and the outlets (4.1) and (4.2), as has been discussed hereinbefore.

In the apparatus according to FIGS. 7 and 8, the impact surface (12) may be further provided with an upright partition (72) indicated in dotted lines in the figure, which causes the coffee extract jet (14.1) to be supplied entirely to the outlet (4.1), while the coffee extract jet (14.2) is supplied entirely to the outlet (4.2). The upright sidewall (72), however, is not requisite. Also in the apparatus according to FIGS. 7 and 8, the inlet (2) may be provided with one spout opening (8.1) only, situated approximately in the middle of the inlet (2). In that case, however, the partition (72) is omitted with a view to causing the coffee extract to be distributed as evenly as possible over the outlets (4.1) and (42). Also, the impact surface in the apparatus according to FIGS. 7 and 8 can consist of an inclined gutter which, on the inside, at least for a part, is provided with the roughened surface structure. In the apparatus according to the FIGS. 7 and 8, the outlets (4.1) and (4.2) can be omitted. The downstream end (74.1) and (74.2) of the impact surface then in fact constitutes the outlets via which the coffee extract is dispensed. The term outlet should therefore be interpreted broadly and does not need to include an opening. In the apparatus according to FIGS. 1 to 6, the bottom (12) of the receiving reservoir can coincide with the bottom (24) of the housing. In that case, however, any drain openings (30.1) and (30.2) and the through-flow openings (32.1) and (32.2) should be located above the outlets (4.1) and (4.2), respectively. The portion of the partition (26) which is located in FIG. 1 between the bottom (12) and the bottom (24) is absent in that embodiment.

Also the normal of the bottom (12) of the receiving reservoir (16) can include an angle A with each of the coffee extract jets, which, for instance, is smaller than 80 degrees, for instance equal to 45 degrees, and preferably equal to zero degrees. Such variants are all understood to fall within the scope of the invention.

Further, the sachet holder (46) and the sachet (47) can be replaced with the assembly of European patent 0 904 717. The opening in the bottom of the holder from the European patent 0 904 717 may then be further provided with a spout opening (nozzle) such as, for instance, the spout openings (18.1) described. The buffer reservoir may also be designed as described in Dutch patents 1012847 and 1018270 while additionally the roughened surface and optionally the liquid flow decelerating barrier is arranged.

What is claimed is:

1. An apparatus for preparing a coffee extract with a fine-bubble froth layer, provided with at least one inlet to which coffee extract is supplied, at least one outlet for dispensing the coffee extract with the fine-bubble froth layer and at least one liquid flow path extending from the at least one inlet to the at least one outlet and along which, in use, the coffee extract flows from the at least one inlet to the at least one outlet, while in the liquid flow path a liquid impact surface is included and the at least one inlet is provided with at least one spout opening for generating at least one coffee extract jet which, in use, squirts to the liquid impact surface when the coffee extract is supplied to the at least one inlet, wherein at least a part of the impact surface is provided with a roughened surface structure.

2. An apparatus according to claim 1, wherein the surface structure has a surface roughness corresponding to the surface roughness of abrasive paper comprising particles having an average diameter of 50–2000 μm.

3. An apparatus according to claim 2, wherein the surface structure has a surface roughness corresponding to the surface roughness of abrasive paper in the range of P12 to P300.

4. An apparatus according to claim 3, wherein the surface structure has a surface roughness corresponding to the surface roughness of abrasive paper in the range of P30 to P300.

5. An apparatus according to claim 1, wherein the surface structure has a surface roughness Ra of 50–2000 μm.

6. An apparatus according to claim 5, wherein the surface structure has a surface roughness Ra of 50–200 μm.

7. An apparatus according to claim 1, wherein the impact surface has been subjected to a spark treatment.

8. An apparatus according to claim 1, wherein the impact surface has been sand-blasted.

9. An apparatus according to claim 1, wherein the impact surface has been chemically etched.

10. An apparatus according to claim 1, wherein along the impact surface a gauze is provided to obtain the roughened surface structure.

11. An apparatus according to claim 1, wherein the impact surface is formed by a gauze through which the at least one coffee extract jet flows.

12. An apparatus according to claim 1, wherein a normal of the impact surface includes an angle A to the coffee extract jet which is less than 800.

13. An apparatus according to claim 12, wherein the normal of the impact surface includes an angle A to the at least one coffee extract jet which is approximately equal to 45°.

14. An apparatus according to claim 12, wherein the normal of the impact surface includes an angle A to the at least one coffee extract jet which is approximately equal to 0°.

15. An apparatus according to claim 1, wherein the at least one coffee extract jet is directed such that, in use, it impinges on a part of the impact surface provided with the roughened surface structure.

16. An apparatus according to claim 1, wherein the at least one liquid flow path a receiving reservoir is included with an upright sidewall and a bottom, the bottom of the receiving reservoir forming the impact surface, so that the at least one coffee extract jet, in use, squirts into the receiving reservoir.

17. An apparatus according to claim 16, wherein the receiving reservoir is provided with at least one liquid discharge path for discharging coffee extract from the receiving reservoir to the at least one outlet.

18. An apparatus according to claim 16, wherein in the receiving reservoir a liquid flow decelerating barrier located at a distance from the upright side walls is included.

19. An apparatus according to claim 18, wherein the liquid flow decelerating barrier is included between a central part of the receiving reservoir and the upright side walls.

20. An apparatus according to claim 19, wherein the at least one coffee extract jet is directed to the central part.

21. An apparatus according to claim 17, wherein the at least one liquid discharge path originates outside, viewed from the central part, the liquid flow decelerating barrier.

22. An apparatus according to claim 18, wherein the liquid flow decelerating barrier extends along a first closed curve extending around the central part.

23. An apparatus according to claim 18, wherein the liquid flow decelerating barrier further extends along a second closed curve extending at a distance around the first curve.

24. An apparatus according to claim 18, wherein the liquid flow decelerating barrier is provided with a number of obstacles located at a distance from each other, extending from the bottom of the receiving reservoir to above.

25. An apparatus according to claim 24, wherein the obstacles are of pin-shaped design.

26. An apparatus according to claim 18, wherein the liquid flow decelerating barrier is provided with a gauze wall extending from the bottom of the receiving reservoir away from the bottom.

27. An apparatus according to claim 1, wherein the apparatus is further provided with means for preparing the coffee extract and for supplying the coffee extract under pressure to the at least one inlet.

* * * * *